United States Patent
Shedley et al.

(10) Patent No.: US 10,297,158 B2
(45) Date of Patent: May 21, 2019

(54) APPARATUS FOR MONITORING EMERGENCY RESPONSE VESSEL POSITION

(71) Applicant: Clarksons Cloud Limited, London (GB)

(72) Inventors: Jamie Mark Shedley, Essex (GB); Eliad Perpinyal, Essex (GB); Richard White, East Sussex (GB); Paul Love, Aberdeen (GB)

(73) Assignee: CLARKSONS CLOUD LIMITED, London (GB)

( * ) Notice: Subject to any disclaimer, the term of this patent is extended or adjusted under 35 U.S.C. 154(b) by 0 days.

(21) Appl. No.: 15/496,698

(22) Filed: Apr. 25, 2017

(65) Prior Publication Data

US 2017/0309189 A1    Oct. 26, 2017

Related U.S. Application Data

(60) Provisional application No. 62/328,677, filed on Apr. 28, 2016.

(30) Foreign Application Priority Data

Apr. 26, 2016    (GB) .................. 1607250.6

(51) Int. Cl.
| | |
|---|---|
| *G08G 3/02* | (2006.01) |
| *G01S 1/24* | (2006.01) |
| *G01S 19/03* | (2010.01) |

(52) U.S. Cl.
CPC ............ *G08G 3/02* (2013.01); *G01S 1/24* (2013.01); *G01S 19/03* (2013.01)

(58) Field of Classification Search
CPC ........................................ G08G 3/02
See application file for complete search history.

(56) References Cited

U.S. PATENT DOCUMENTS

| | | |
|---|---|---|
| 7,047,114 B1 | 5/2006 | Rogers |
| 2002/0169527 A1 | 11/2002 | Cline |

(Continued)

FOREIGN PATENT DOCUMENTS

| | | |
|---|---|---|
| GB | 2506108 A | 3/2014 |
| JP | 6454823 A | 3/1989 |
| KR | 20140128681 A | 11/2014 |

OTHER PUBLICATIONS

Jean Marechal, To All the Ships at Sea: GNSS and Maritime Surveillance, GPS World, Jul. 2004.

*Primary Examiner* — Basil T. Jos
(74) *Attorney, Agent, or Firm* — Morris, Manning & Martin, LLP; Daniel E. Sineway, Esq.; Bryan D. Stewart, Esq.

(57) ABSTRACT

An apparatus and computerized method are provided for monitoring the positions of a plurality of vessels that may be capable of responding to an event one or more vessels. The apparatus comprises a first receiver device configured to receive vessel identification and vessel position information originating from respective sources located onboard each of the plurality of vessels; a second receiver device configured to receive a plurality of vessel data fields regarding the plurality of vessels from a vessel database; a third receiver device configured to receive a data request, the data request identifying an event; and a processor configured to receive and correlate the vessel position information and the plurality of vessel data fields for each of the plurality of vessels to produce vessel response data.

30 Claims, 8 Drawing Sheets

(56) References Cited

U.S. PATENT DOCUMENTS

| | | |
|---|---|---|
| 2004/0111195 A1 | 6/2004 | Vries et al. |
| 2010/0033363 A1 | 2/2010 | Lee et al. |
| 2011/0215948 A1 | 9/2011 | Borgerson et al. |
| 2014/0218217 A1 | 8/2014 | Calvar Antón et al. |
| 2014/0266793 A1 | 9/2014 | Velado et al. |

FIG. 5

APPARATUS FOR MONITORING EMERGENCY RESPONSE VESSEL POSITION

CROSS REFERENCE TO RELATED APPLICATION

This application claims priority to, and the benefit under 35 U.S.C. § 119 of U.S. Provisional Patent Application No. 62/328,677, filed Apr. 28, 2016, and entitled "APPARATUS FOR MONITORING EMERGENCY RESPONSE VESSEL POSITION," and to Great Britain Patent Application No. 1607250.6, filed Apr. 26, 2016, both of which are incorporated herein by reference as if set forth herein in their entireties.

FIELD OF THE INVENTION

The present invention relates to an apparatus and method for monitoring the position and other information of a plurality of vessels that may be capable of responding to a given event. In particular, the present invention relates to an apparatus and method for monitoring the position of a plurality of marine emergency response vessels and determining emergency response vessels that would be appropriate to respond to a given situation.

BACKGROUND TO THE INVENTION

In the event of a marine emergency, it is important to formulate an emergency response plan as soon as possible. Typically this will involve the mobilisation of vessels that happen to be in the vicinity of the marine emergency. The marine emergency may relate to an event at an offshore platform, such as an oil well, or another marine vessel, for example a tanker. Accordingly the marine emergency event may take many forms including, but not limited to, a subsea or surface blowout of an oil or gas well, a vessel or well leaking fuel or cargo, a vessel sinking due to a collision or a vessel propulsion failure.

In one common approach, the administrator of the structure or vessel that is experiencing an emergency may broadcast a plea for any available vessels in the vicinity to divert from their current activity and to provide assistance in responding to the emergency event. However, specific vessel capabilities may be required in order to deal with the emergency event such that some vessels may not be appropriate for dealing with the emergency event.

If it is known that a vessel or a number of vessels are en route to attend the scene of the emergency event then other appropriate vessels may decide not to provide assistance in responding to the emergency event. It may only later be discovered that the vessels that have attended the scene of the emergency event are not suitable for responding to the emergency event and thus it may be necessary to broadcast a new plea for assistance. This will have resulted in considerable delay to the resolution of the emergency event and will increase the negative impact of the emergency event, for example the operational and environmental impacts.

It has been appreciated by the present applicants that an improved system is required in order to identify suitable vessels for responding to an emergency event and to obtain their assistance.

SUMMARY OF THE INVENTION

According to a first aspect of the invention, there is provided an apparatus for monitoring the positions of a plurality of vessels that may be capable of responding to a given event. The apparatus comprises a first receiver device configured to receive vessel identification and vessel position information originating from respective sources located onboard each of the plurality of vessels; and a second receiver device configured to receive a plurality of vessel data fields regarding the plurality of vessels from a vessel database.

The apparatus further comprises a third receiver device configured to receive a data request, the data request identifying an event; and a processor configured to receive and correlate the vessel position information and the plurality of vessel data fields for each of the plurality of vessels to produce vessel response data. The processor is further configured to receive the data request and to filter the vessel response data based on the event identified by the data request; and an output interface is configured to output the filtered vessel response data.

In some embodiments, the first receiver device is configured to receive AIS positional messages comprising the vessel position information and the first receiver device is further configured to receive AIS informational messages.

The apparatus advantageously enables data regarding vessels that may be capable of responding to a given event to be output in response to a request in a pre-filtered form using knowledge about the vessels and the characteristics needed to respond to a given event.

Optionally, the AIS informational messages may comprise a draught measurement for each of the plurality of vessels, wherein the processor is further configured to receive the draught measurements and to receive a maximum draught rating for each of the plurality of vessels from the vessel database. The processor may be further configured to determine that a given vessel is currently laden if the ratio of the draught measurement to the maximum draught rating is above a predetermined threshold and to determine that the vessel is currently on a ballast voyage if the ratio of the draught measurement to the maximum draught rating is below the predetermined threshold.

In one embodiment, if a vessel is determined to be currently laden, the processor is further configured to filter out the laden vessel, or the output interface is configured to output a warning associated with the laden vessel. This advantageously warns a user or filters out the vessel data if a vessel is likely to be laden and therefore likely to already be chartered and therefore unavailable for responding to the event.

Preferably, the processor is further configured to automatically update a vessel data field of the vessel database based on vessel information received at the first receiver device. Furthermore, the vessel data field automatically updated by the processor may include at least one of a maximum observed vessel speed, a draught measurement, and a vessel laden status. In this manner, the apparatus may advantageously keep the vessel database relevant and up to date.

In one embodiment, the received data request further identifies a location associated with the event. Alternatively, the received data request may further identify an offshore platform or requesting vessel associated with the event and, in response to the received data request, the processor is configured to obtain the location of the offshore platform or requesting vessel associated with the event from an offshore platform database or the received vessel position information based on the respective identification of the offshore platform or requesting vessel. These two embodiments enable the apparatus to be able to determine a location associated with the event so that this can be taken into account in the filtering.

Advantageously, the received data request may further identify a maximum distance and the processor may further be configured to determine a response distance from each of the vessels of the filtered vessel response data to the location associated with the event and to further filter the filtered vessel response data to only include vessels having a response distance less than or equal to the maximum distance.

Furthermore, the processor may optionally be configured to determine the response distance based on a set of predetermined waypoint data received from a route database and the received vessel draught measurement. This advantageously provides a response distance using an accurately estimated path that the vessel is likely to take if it responds to the identified event.

In one embodiment, the processor may be configured to determine the response distance from each of the vessels of the filtered vessel response data to the location associated with the event via a port location. This enables the response distance to take into account the situation where the vessel may need to unload its current cargo or to load new cargo intended for the event response and therefore provide a more accurate response distance.

Preferably, the processor may be configured to determine a response time based on the response distance and a maximum observed vessel speed. This advantageously provides a measure of how long it will take for a given vessel to respond to the event response request that takes into consideration the respective maximum speeds of the vessels based on their recently monitored movements.

The processor may be further configured to filter the filtered vessel response data based on at least one of a minimum crane wire length, a remotely operated underwater vehicle requirement, a supply vessel minimum deck area, an oil tanker classification or an oil spill response capability associated with the event identified by the received data request. This advantageously ensures that the vessels identified in the filtered vessel response data will be capable of responding to the event since they will meet the event response criteria.

Preferably, the processor is configured to automatically obtain the minimum crane wire length and a remotely operated underwater vehicle requirement from an offshore platform database if the received data request indicates that the event is a subsea response. This reduces the amount of information that the user is required to input in order to submit the data request and receive an appropriate set of filtered vessel response data.

Finally, the output interface may be further configured to output the filtered vessel response data in either a grid format or a map format for overlaying geographical mapping data.

According to a second aspect of the invention, there is provided a computerized method for monitoring the position of a plurality of vessels that may be capable of responding to an event. The method comprises receiving, at a first receiver device, vessel identification and vessel position information originating from respective sources located onboard each of the plurality of vessels; receiving, at a second receiver device, a plurality of vessel data fields regarding the plurality of vessels from a vessel database; and receiving, at a third receiver device, a data request, the data request identifying an event.

The method further comprises correlating, at a processor, the received vessel position information and the plurality of vessel data fields for each of the plurality of vessels to produce vessel response data; filtering, at the processor, the vessel response data based on the event identified by the data request; and outputting, at an output interface, the filtered vessel response data.

In some embodiments, the method comprises receiving, at the first receiver device, AIS positional messages, comprising the vessel position information, and AIS informational messages.

Optionally, the AIS informational messages comprise a draught measurement for each of the plurality of vessels and the method further comprises receiving, at the processor, the draught measurements, and a maximum draught rating for each of the plurality of vessels from the vessel database; and determining, at the processor, that a given vessel is currently laden if the ratio of the draught measurement to the maximum draught rating is above a predetermined threshold and to determine that the vessel is currently on a ballast voyage if the ratio of the draught measurement to the maximum draught rating is below the predetermined threshold.

In one embodiment, if a vessel is determined to be currently laden, the method further comprises filtering out, at the processor, the laden vessel, or outputting, from the output interface, a warning associated with the laden vessel.

Preferably the method further comprises automatically updating, by the processor, a vessel data field of the vessel database based on vessel information received at the first receiver device. The vessel data field may be automatically updated by the processor includes at least one of a maximum observed vessel speed, a draught measurement, and a vessel laden status. Furthermore, the received data request may further identify a location associated with the event.

Alternatively, the received data request may further identify an offshore platform or requesting vessel associated with the event and, in response to the received data request, the method further comprises obtaining, by the processor, the location of the offshore platform or requesting vessel associated with the event from an offshore platform database or the received vessel position information based on the respective identification of the offshore platform or requesting vessel.

Advantageously, the received data request optionally further identifies a maximum distance and the method further comprises determining a response distance from each of the vessels of the filtered vessel response data to the location associated with the event and filtering the filtered vessel response data to only include vessels having a response distance less than or equal to the maximum distance.

Furthermore, the response distance based on a set of predetermined waypoint data received from a route database and the received vessel draught measurement may be determined. In one embodiment, the response distance from each of the vessels of the filtered vessel response data to the location associated with the event via a port location is determined. Preferably the method further comprises determining a response time based on the response distance and a maximum observed vessel speed.

The method may comprise further filtering the filtered vessel response data based on at least one of a minimum crane wire length, a remotely operated underwater vehicle requirement, a supply vessel minimum deck area, an oil tanker classification or an oil spill response capability associated with the event identified by the received data request.

Preferably the method further comprises automatically obtaining the minimum crane wire length and a remotely operated underwater vehicle requirement from an offshore platform database if the received data request indicates that the event is a subsea response.

Finally, the method may further comprise outputting, from the output interface, the filtered vessel response data in either a grid format or a map format for overlaying geographical mapping data.

BRIEF DESCRIPTION OF THE DRAWINGS

Embodiments of the invention will now be described, by way of example only, and with reference to the accompanying drawings, in which:

FIG. 5 is a screen shot of the vessel position information displayed in a grid format with additional vessel information;

DESCRIPTION OF THE INVENTION

Figure 1:
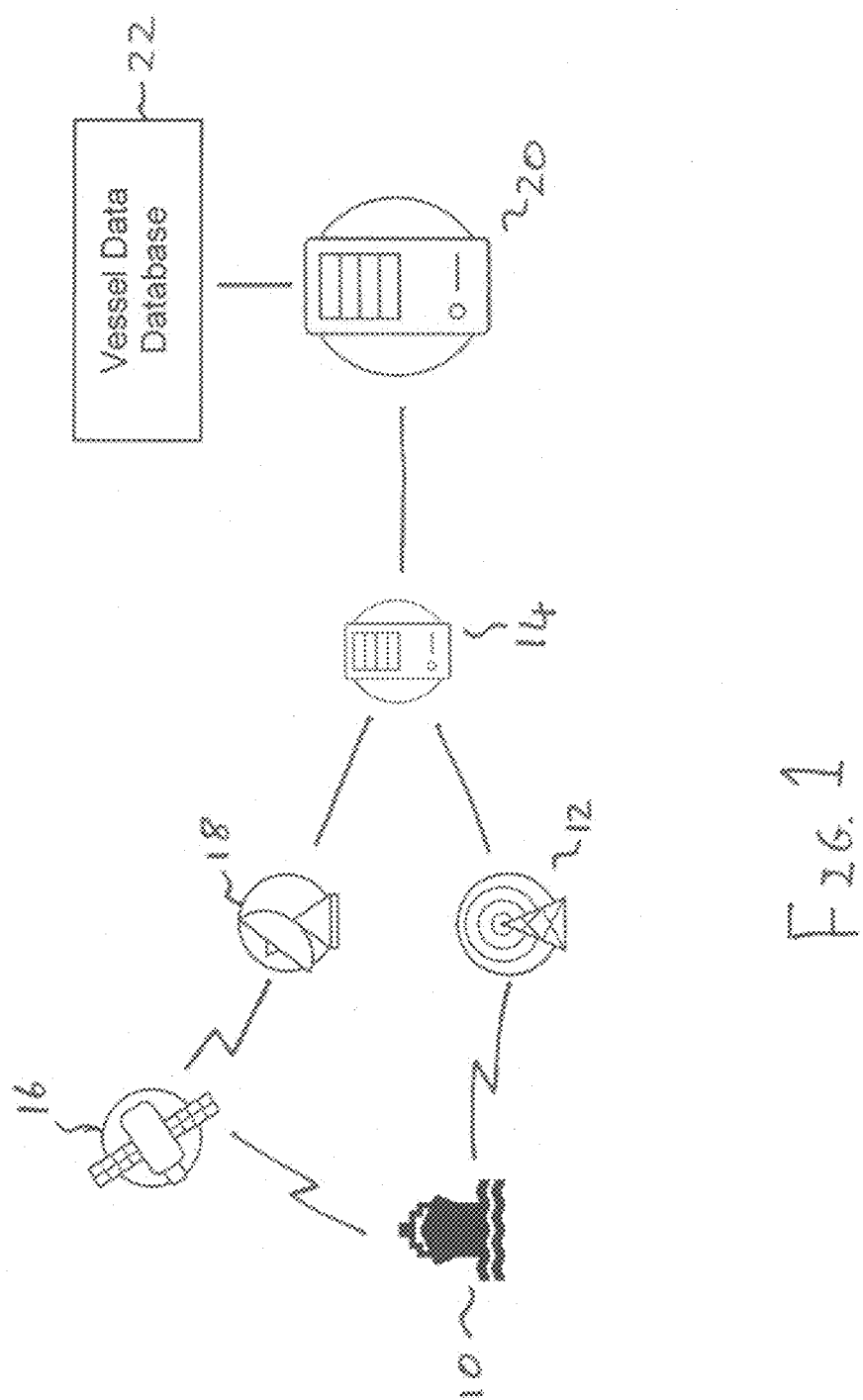
FIG. 1 is a schematic representation of an apparatus according to an embodiment of the invention interacting with the data sources.

Since 2002, the Automatic Identification System (AIS) tracking and collision avoidance system has been mandated by the International Maritime Organisation (IMO) under the International Convention for the Safety of Life at Sea treaty for all internationally voyaging ships with a gross tonnage of 300 GT or more and for passenger ships of all sizes. The treaty requires the AIS systems fitted to be capable of providing information about the ship or vessel to other vessels and to coastal authorities automatically. AIS systems have also been fitted onto many vessels that are not required to by the treaty.

The AIS system generally includes (or is connected to the output of) a positioning system, such as a GPS (Global Positioning System) or a LORAN (Long Range Navigation) system, a transceiver that typically operates in the VHF range (in particular the Marine Band Channels that are allocated globally), a gyrocompass and a rate of turn indicator. The positioning system is used by the AIS system to determine a current location of the vessel, the gyrocompass is used to determine the heading of the vessel, the rate of turn indicator outputs the rate, in degrees per minute, that the vessel is turning at a given moment in time and the VHF transceiver is used to provide a data link for the AIS system to send and receive AIS messages.

The AIS system broadcasts the AIS messages, which may be received by nearby vessels or outposts, land or water based base stations, or alternatively the broadcast message may be received by a satellite and then forwarded onto a base station. The range of an AIS message broadcast over VHF is typically around 10 to 20 nautical miles and thus a relatively large number of receivers are required to provide coverage for receiving AIS messages over a wide area. Recently, service providers have begun to aggregate this data in order to make it available to clients over a communication means, such as the internet, facilitating the tracking of vessels over wider regions.

Two different types of AIS messages are typically transmitted by the AIS system, positional messages and informational messages, both of which will be transmitted with a Maritime Mobile Service Identity (MMSI) number that has been programmed into the AIS system of the vessel. The MMSI number is a unique 9-digit number that is issued to the vessel by the Ship Registry that the vessel is registered with.

Positional messages typically include the latitude and longitude, speed over ground and course over ground and/or true heading in addition to the MMSI number. The rate of turn, an accuracy measure of the positional information and a navigation status field may also be included in the positional messages. With the exception of the navigation status field, all of these fields are automatically generated by the AIS system based on the data sources that are either integral to or connected to the AIS system.

The navigation status field is typically manually entered by one of the crew, for example the captain or the first officer, and may take one of a number of standard values, including 'under way using engine', 'at anchor', 'not under command', 'restricted manoeuvrability', 'constrained by her draught', 'moored', 'aground', 'engaged in fishing', or 'under way sailing'. In this context, it is noted that the draught of a vessel (sometimes written as draft) is a measure of the depth of the keel of the vessel below the waterline and is therefore a measure of both the loading of the vessel (either by cargo or ballasting) and the depth of water that the vessel can safely navigate through without running aground.

Informational messages typically include the vessel name, call sign, the vessel's IMO identification number, the destination and estimated time of arrival (ETA), the vessel's beam (the width at it's widest part), overall length (LOA), draught, the type of ship and the type of cargo (for example if it is hazardous cargo). Furthermore, the informational messages may additionally identify the type and location of the positioning system that is being used by the AIS system.

Typically, each of the fields transmitted in the informational messages can be modified manually onboard the vessel, for example by the captain or the first officer. Accordingly, it is possible for these values to be entered incorrectly, this may lead to two vessels transmitting AIS messages using the same MMSI number, which would lead to conflicting data being received by the system. This may make it difficult to process and piece together a number of events with invalid or duplicated MMSI or IMO identification numbers, since a vessel may appear to have jumped to a different part of the world when this would not be possible based on the time since the last report and the maximum speed rating of the vessel.

It will be appreciated that not all of the informational message data fields are required to be broadcast in a functioning AIS system and that some of these fields may be omitted or alternatively have a null value.

Furthermore, the draught of the vessel is typically computed automatically by control systems on the vessel and accordingly the draught value of the AIS system is usually controlled by the vessel control system. A 'received' timestamp is appended both to positional and informational AIS messages by the satellite or base station that receives the AIS VHF transmission in order to provide a time record of when the AIS message was received.

This data may be used by harbour or port authorities, potentially in combination with traditional maritime radar data, in order to track the progress of a number of vessels in a given region and may also be provided as a service to other users.

The IMO of the vessel is the standard means for uniquely identifying a vessel in the shipping industry; however, it is not one of the data fields typically transmitted with the positional information. Thus the MMSI provided in both the positional and informational messages may be used to provide a link that ties the positional data broadcast to a given vessel IMO number.

According to a first aspect of the invention, and with reference to FIG. 1, AIS data can be used to monitor vessels 10 over large regions of waterways by providing a network of receivers 12. Furthermore, the graphical coverage of such an apparatus can be extended simply by providing additional receivers, or ground stations 12, and connecting these ground stations to the existing ground stations using a communications distribution network 14.

The communications distribution network 14 may be any public, private, wired or wireless network. The distribution network may include one or more of a local area network (LAN), a wide area network (WAN) 14, the internet, a mobile telephony communication system, or a satellite communication system. The distribution network may comprise any suitable infrastructure, including copper cables, optical cables or fibres, routers, firewalls, switches, gateway computers and edge servers.

These ground stations 12 may comprise VHF ground stations that operate on the VHF radio frequency range. The term "ground station" is used herein to refer to any receiver station at ground level. For the avoidance of doubt, these ground stations may include receivers located on offshore platforms—such as oil rigs or other ocean platforms—or floating vessels, such as tankers or aircraft carriers. The data from each ground station may then be collected by the network 14 and combined to form a consolidated database of AIS data that may be used for monitoring vessels 10 within the range of the network of ground stations 12. The coverage of each ground station is in the form of a line of sight cone with a typical operational range of around 20 nautical miles.

The location of the ground stations 12 is typically not relevant, since all of the necessary position data is transmitted by the AIS fitted vessel 10; however, the closer the ground station 12 is to the vessel 10, the more accurate the timestamp will be, since the timestamp is a received timestamp rather than a transmitted timestamp as set out above.

The transmission signal for the AIS data messages may be direct from the vessel 10 to the ground station 12, or alternatively the message may initially be received from the vessel at a satellite link 16. The satellite 16 may then forward the AIS data messages to the network 14 via a satellite ground station 18.

When the AIS system of the vessel 10 is turned on, the AIS positional data is typically broadcast substantially continuously, i.e. with a short period such as 1 second or a longer period such as every few minutes, such that a stream of substantially real-time vessel position information can be received by AIS data receiver boxes, known as ground stations 12. The broadcast periodicity of the positional messages may depend on the speed of the vessel, for example such that the AIS data is transmitted every 1 to 10 seconds when the vessel is underway and every 3 minutes when the vessel is moored, at anchor or aground. The broadcast periodicity of the informational messages is typically less frequent, for example in the order of every 6 to 10 minutes.

The AIS data, containing positional and informational messages, may then be collected centrally by an apparatus 20 over the distribution network 14. The AIS data at the apparatus 20 is typically updated in the order of every 15 minutes. In this manner, the present system may utilize near real-time AIS data covering substantially the entire globe using low geostationary satellites and strategically placed land or water based receivers that are capable of picking up the AIS data from transmitting vessels.

Figure 2:
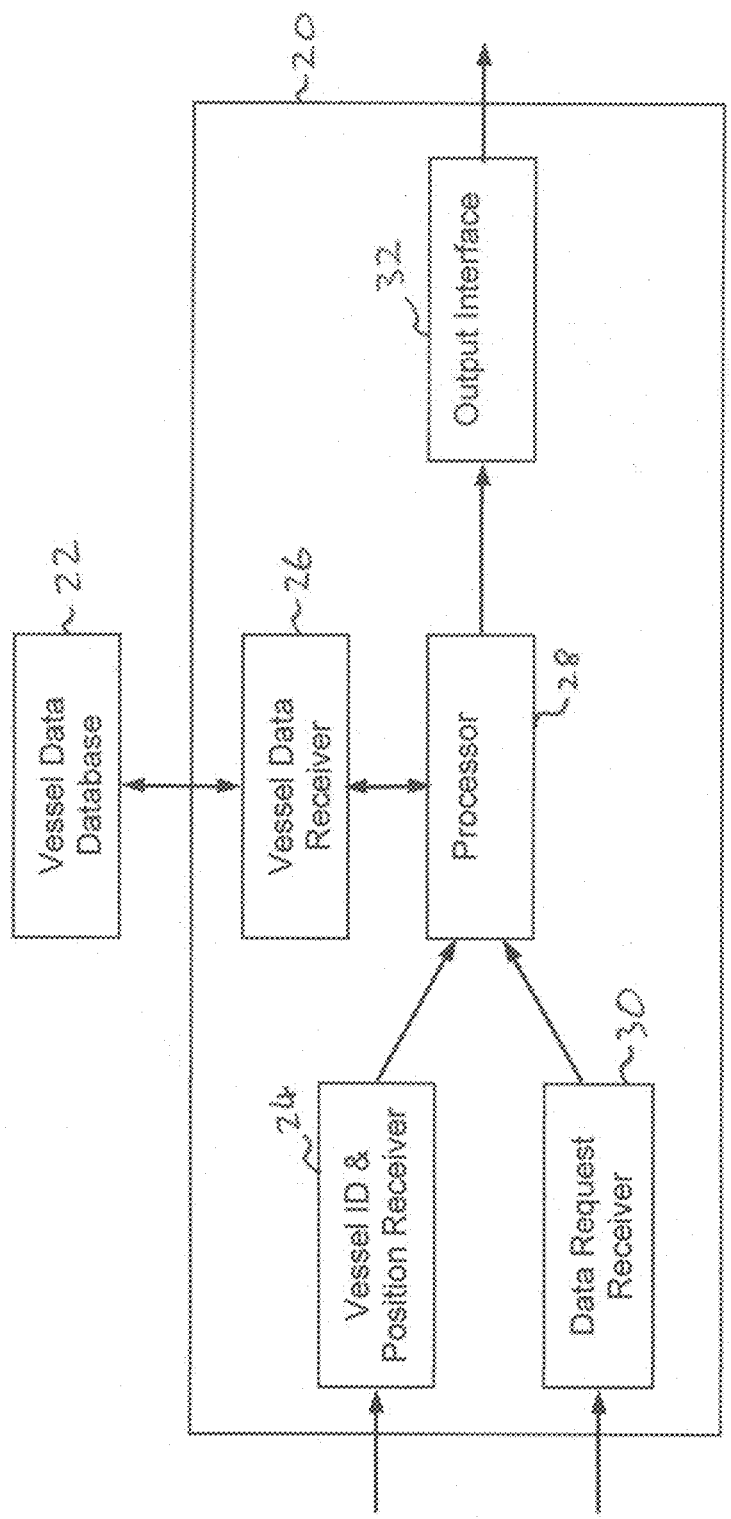
FIG. 2 is a schematic representation of an apparatus according to an embodiment of the invention.

In one embodiment, with reference to FIG. 2, the apparatus 20 is arranged to receive vessel position information from the AIS system onboard the vessel, via the distribution network 14, at a first receiver device 24 that may be referred to as a vessel identification and position receiver. The vessel position information may be represented as a latitude and longitude of the vessel and will be accompanied by a unique identification of the vessel that the position information relates to, for example the vessels MMSI number. However, other positional information may optionally be received at the first receiver 24, for example the heading, speed and course over ground, rate of turn and navigational status etc. as set out above for AIS positional messages.

The apparatus 20 also includes a second receiver device 26 that may be referred to as a vessel data receiver, which is configured to receive vessel data from the vessel database 22. The vessel data may comprise a plurality of vessel data fields for each known vessel identified in the vessel database. For example, the vessel data fields may include the IMO and MMSI numbers associated with the vessel, the name and call sign of the vessel, the type of vessel (for example a platform supply vessel or an anchor handling tug supply vessel), the dimensions of the vessel (including length overall and beam), the maximum speed and maximum draught rating of the vessel, whether the vessel has a crane and the maximum length of the crane wire, whether the vessel has a remotely operated underwater vehicle (ROV) onboard, the owner of the vessel and other operational data regarding the vessel.

The apparatus 20 further includes a processor 28 that is configured to receive the plurality of vessel data fields regarding each of the known vessels from the second receiver and to receive the vessel position information, and any other associated information, from the first receiver. This information may then be correlated to match up the pieces of information regarding each known vessel and enrich the respective data sets; this correlated vessel data may be referred to as vessel response data. Optionally the vessel response data may be stored locally by the apparatus 20, or alternatively the correlated position information may be sent to the vessel database 22 for storage.

The apparatus 20 also includes a third receiver device 30 that may be referred to as a data request receiver. The third receiver may receive a data request from a user regarding the position of one or more of the plurality of vessels that are monitored by the apparatus, the data request also identifying an event. This event may imply certain characteristics that are required for a vessel to be capable of responding to the event.

Accordingly, the processor is further configured to filter the vessel response data in response to receiving the data request and based on the event identified by the data request. The processor 28 may then cause the filtered vessel response data to be output from the apparatus 20 at an output interface 20. The output interface 20 may be configured such that the filtered vessel response data is output to the user that sent the data request.

In one embodiment, the vessel position information and vessel identification information received by the first receiver 24 preferably comprises AIS positional messages. Furthermore, the first receiver 24 preferably also receives AIS informational messages. In preferred embodiments, the data received at the first receiver 24 will first be parsed to verify that the received information corresponds to AIS message data. If the data does not correspond to AIS message data then the data may simply be discarded. In the event that the data does correspond to AIS message data, then the AIS message data may be passed to a vessel matching process. A copy of the AIS message data may also be stored in an archive.

In the vessel matching process, the received AIS message data is compared with the data held in the vessel database 22 to determine if the AIS message data relates to a known vessel that has a vessel record in the vessel database 22. The vessel record in the vessel database preferably includes both the IMO and MMSI number of the known vessels.

If the received AIS message is an informational message then either the MMSI or IMO number identified in the AIS message may be compared against the corresponding data included in the vessel database. If the received AIS message is a positional message then the message will not include the IMO number of the relevant vessel and accordingly the MMSI number will be compared against the MMSI numbers included in the vessel database, in this manner the IMO number corresponding to the received positional information of a known vessel may be determined.

If it is determined that the AIS message does not correspond to a known vessel then the AIS message may be ignored. As set out above, in a preferred embodiment a copy of the AIS message will already have been stored in an archive and therefore this data may be retrieved if a vessel data is subsequently added to the vessel database 22.

If it is determined that the AIS message corresponds to a known vessel then the AIS message may be stored and associated with the known vessel. The AIS message may be used to supplement or update the vessel data fields held in the vessel database 22, and/or the AIS message may be stored locally in the apparatus 20. If positional AIS messages are stored locally then the IMO number of the vessel is preferably appended to the positional message data. This makes it easier for the positional message data to be linked to other databases, which typically identify vessels by their IMO number rather then the MMSI number.

In a preferred embodiment, the received positional or informational AIS messages corresponding to known vessels may be validated, respectively against historical positional and informational AIS messages, prior to the AIS messages being stored and associated with the known vessel. If this validation fails then the AIS message data may be discarded despite the determination that is corresponds to a known vessel.

For positional AIS messages, the validation may comprise analysing the distance between the latitude and longitude position identified in the received positional message and the position identified in the next most recently received positional message for the known vessel, which may have been stored in the locally in the apparatus 20 or by supplementing or updating the vessel data fields held in the vessel database 22, as well as the respective received timestamps of the positional messages. If the sequence of events and the newly received positional message indicates that the known vessel has travelled a distance, for example a vast distance, that it would not be possible for the known vessel to travel based on the maximum speed of the vessel and the time between the positional messages then the newly received positional message may be discarded.

For informational AIS messages, the validation may comprise checking that the MMSI number received is consistent with other data contained in the AIS message. For example, it may be verified if the IMO and MMSI numbers included in the informational message correspond to the IMO and MMSI number pair held in the vessel database 22. The IMO number includes a check digit and accordingly the system may also process the IMO number to validate whether the check digit matches the rest of the digits of the IMO number.

In this manner, the system may validate information messages that have a correct IMO and MMSI pair and disregard informational messages where it has been determined that at least one of the IMO or MMSI number has been entered incorrectly. This incorrect entry may have been carried out either accidentally or on purpose; however it indicates that the data contained in the information message may not be trustworthy.

A part of the MMSI number indicates the ship registry, sometimes known as a flag authority, which is issued by the MMSI number to a vessel. Accordingly, the applicants have appreciated that AIS messages may alternatively or additionally be validated by determining if the ship registry identified in the MMSI number corresponds to the ship registry identified in one of the other fields of the AIS message where this ship registry information is included in the AIS message. If this does not correspond then the AIS message may be discarded.

Furthermore, other aspects of the AIS messages may be used to validate the continuity of the AIS messages. For example fields such as the vessel type and dimensions, which may be expected to remain constant between AIS message transmissions, may be analysed validate AIS messages and to determine if one or more of the AIS messages should be ruled out or discarded.

In one embodiment, the received data request may identify a location associated with the event. For example the event may relate to a subsea and/or surface blowout that has occurred at an offshore platform such as an oil well. Accordingly, the data request may specify the location coordinates of the oil well.

In an alternative embodiment, the received data request may simply identify an offshore platform or vessel associated with the event, i.e. where the event has occurred. In this embodiment, the system is preferably arranged to obtain the location associated with the event at the offshore platform or vessel. If the data request identifies a vessel then the vessel position information may be obtained by the processor from the vessel position information received at the first receiver.

Figure 3:
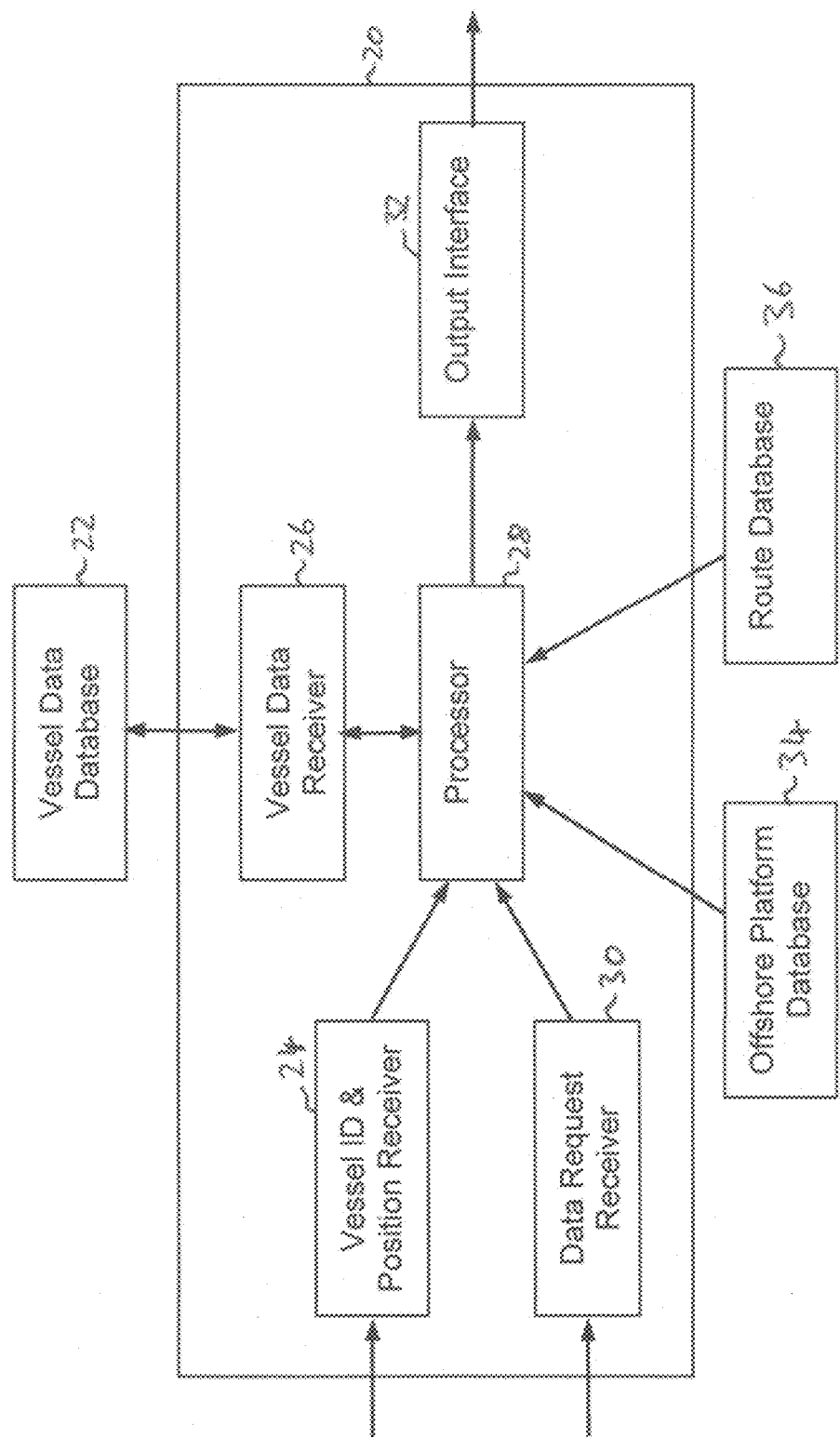
FIG. 3 is a schematic representation of an apparatus according to a further embodiment of the invention.

If the data request identifies a fixed asset such an offshore platform then the location of the offshore platform may be obtained by the processor from an offshore platform database 34 as illustrated in FIG. 3. Like components in FIG. 3 have been given like reference numerals with respect to FIGS. 1 and 2 and thus the discussion of these components will not be repeated.

Optionally, the received data request may further identify a maximum distance away from the event location that the user requires any potential response vessels to be within. This maximum distance may be manually entered by the user in nautical miles and may be used by the processor 28 to filter the vessel response data based on a determined response distance from each of the vessels to the event location. In this embodiment, the processor 28 may only cause vessel response data corresponding to vessels that have been determined to have a response distance that is less than or equal to the maximum distance identified in the received data request to be output.

In this embodiment, the processor 28 may determine the response distance using a routing graph algorithm to identify a route from the vessel to the event location. In shipping, vessels will typically travel in shipping lanes or along other paths that have determined to have comparatively favourable conditions. Accordingly, the route is preferably determined to comprise a plurality of waypoints rather than a direct route. This waypoint data may be received from a route database 36, as illustrated in FIG. 3, and used by the processor 28 to determine the response distance.

The paths that are available to a given vessel may also vary based on the draught of the vessel, since vessels with a smaller draught will be able to travel through shallower waters, for example certain canals. Accordingly, the processor may take into account a vessel draught measurement received in the informational AIS messages associated with a given vessel when determining the response distance for the vessel.

Furthermore, the user may specify exclusion zones in the data request received at the apparatus 20. The exclusion zones are polygon areas that a determined route for a response distance is not permitted to intersect. For example, the exclusion zone may cover the waters around Somalia or alternatively the exclusion zone may correspond to the Suez Canal. In this manner, the user may cause the response distances to be calculated based on routes with a risk that is acceptable to the user and thus the relevance and accuracy of the determined response distances will be improved.

In a further embodiment, the user may specify a time threshold for the acceptable age of the vessel position data in addition, or as an alternative, to the maximum distance threshold. Accordingly the processor 28 may filter the vessel response data to include only vessels that are associated with a received position within the time threshold in the output filtered vessel response data.

In one embodiment, the event identified in the data request may be one of a shipping or logistics event, a surface event or a subsea event. The surface and subsea events in particular may relate to an emergency situation. For a shipping or logistics event, additional supplies, personnel or replacement parts may be needed at the location of the event, for example an oil well. Alternatively, the oil well anchorage may need adjusting. Accordingly, a data request relating to a shipping or logistics event may specify a minimum required deck area and furthermore may specify if a platform supply vessel (PSV) or anchor handling tug supply (AHTS) vessel is required.

For a subsea event, a subsea well may need capping; furthermore, debris may need to be removed in order for a capping stack to be installed at the site of the failed wellbore and capping to take place. Accordingly, a data request relating to a subsea event may specify the requirement for debris removal and/or well capping capabilities, such as the possession of cutting and/or capping tools. In particular, the data request may specify whether a vessel with an ROV and a crane with a minimum crane wire length is required.

For a surface event, an oil tanker may be required to siphon off oil from the tanks on a vessel or platform that may be leaking, and/or vessels able to contain and clean up oil spills may be required. Accordingly, a data request relating to a surface event may specify that these types of response vessels are required.

In response to receiving such data requests, the processor 28 may be configured to filter the vessel response data based on a minimum crane wire length, a remotely operated underwater vehicle requirement, a supply vessel minimum deck area, an oil tanker classification or an oil spill response capability criterion listed in the vessel database 22. In this manner, the apparatus 20 may output an improved set of filtered vessel response data to the user based on the type of event that the user is experiencing.

In an embodiment wherein the processor 28 is in communication with the offshore platform database 34, and a data request for a subsea response event is received, the depth of the offshore platform may be obtained, by the processor, from the offshore platform database. For example, the known well depth of an oil well may be used as the minimum crane wire length that is required to perform capping or debris removal tasks. Typically an ROV will also be required in these circumstances. Thus, the vessel response data may be automatically filtered using these criteria.

Figure 4:
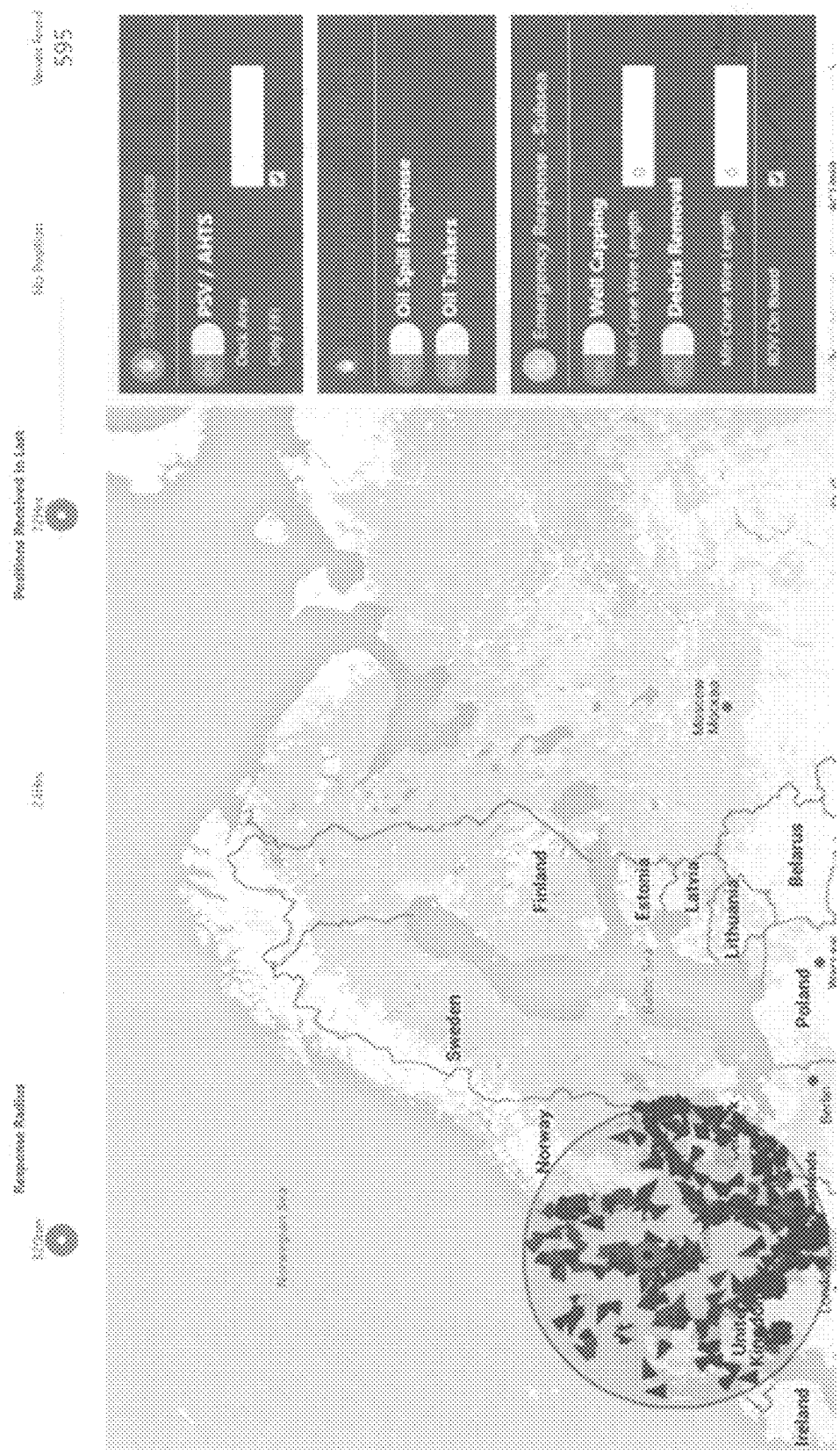
FIG. 4 is a screen shot of the vessel position information overlaid with geographical mapping data.

Furthermore, the output interface 32 of the apparatus 20 may be configured to output the filtered vessel response data in a map format by overlaying geographical mapping data with icons representing the most recent known location of each of the vessels included in the filtered vessel response data as shown in FIG. 4. Additional information regarding each of the vessels may be obtained by clicking on the respective icons. In a further embodiment, the age or reliability of the vessel response data may also be reflected graphically, for example by using the colour of the icon or text associated with the data. This may be green for up-to-date information or amber and then red for comparatively less up-to-date information.

Figure 5:
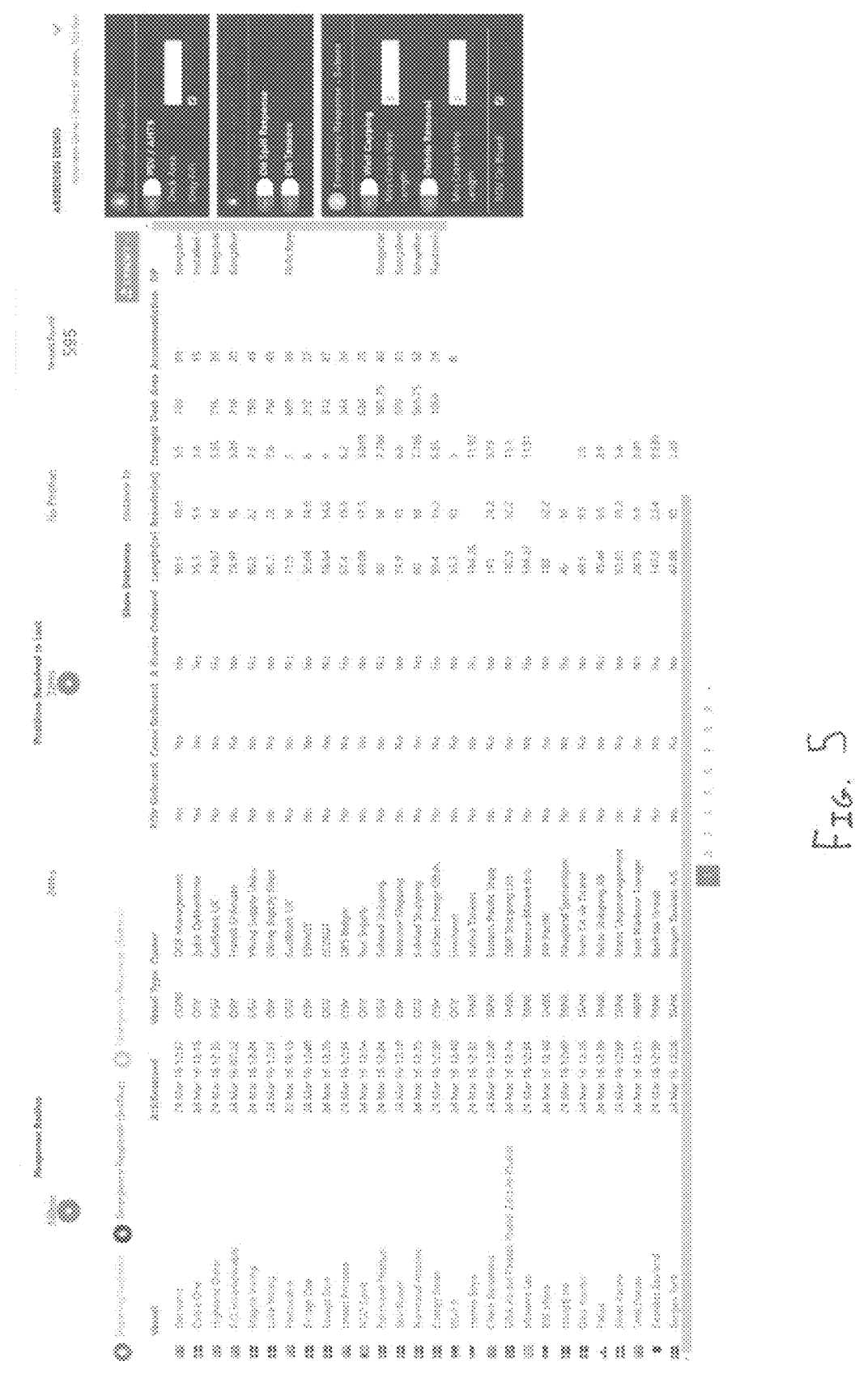

Alternatively, or additionally, the output interface 32 of the apparatus 20 may be configured to output the filtered vessel response data in a grid format as shown in FIG. 5.

In a further embodiment, in particular with relation to shipping or logistics events, a vessel capable of responding to the event may be required to go to the event location via a port in order to collect the required supplies, personnel or replacement parts. Accordingly, the processor may be configured to determine the response distance by determining a route from the vessel location to the location of a port and then onwards to the event location. This advantageously enables the response distance to more accurately account for the required route of a logistics event.

It has been appreciated by the applicant that some specifications of a vessel may change throughout the lifetime of the vessel; accordingly the ship yard specifications may no longer accurately describe the specifications of a given vessel after the vessel has left the ship yard. For example, the vessel may have undergone upgrades that improve the vessel specifications, or alternatively the vessel may have deteriorated and any repairs may not have brought the vessel back up to the factory specifications. Accordingly, it is necessary to actively maintain up to date details regarding a vessel, for example by updating the vessel database 22 whenever new information is available.

This updating may be carried out manually based on market intelligence, for example when it is discovered that a vessel captain has needed to cut off a tangled or damaged section of the crane wire on a vessel, thus reducing the maximum available crane wire length. However, in one embodiment the processor 28 is configured to automatically update a vessel data field based on the received data.

For example, the processor 28 may monitor the average and or maximum speed that a vessel's positional AIS message data reports over a period of time. In this manner, the apparatus 20 may determine that the maximum speed recorded is substantially lower than that currently listed in the vessel database 22 as the given vessel's maximum speed. This maximum observed speed may then be recorded in the vessel database 22 to give a more accurate representation of the vessel's speed.

In some embodiments, this maximum observed speed may in turn be used by the processor 28 to determine a response time for a given vessel based on the determined response distance and the maximum observed vessel speed.

As described above, vessels in the vicinity of an event location may be identified and filtered based on their distance from the event location and their technical capability to respond to the event. However, a vessel may already be chartered and thus it may be desirable for the user to be made aware that one or more of the vessels identified in the vessel response data is, or may be, currently chartered on another journey or fix. Furthermore, the user may wish to filter out vessels that are or already may be chartered.

This data may be obtained via market intelligence, reports from port authorities or fixture information regarding vessels; however, the present applicant has appreciated that it would be desirable to be able to infer the chartered status of a vessel automatically. In the present invention, this may be achieved by processing the AIS data received for a given vessel in order to determine if the vessel is laden and therefore if the vessel is currently chartered.

In an embodiment, the processor 28 may be configured to receive a draught measurement from the informational AIS messages corresponding to a given vessel and a maximum draught rating field may be obtained from the entry in the vessel database 22 for the given vessel. The maximum draught rating is the maximum draught that the vessel can safely experience. When the vessel is loaded the draught will increase and shipping vessels will typically have a high ratio of the current draught to the maximum draught since it is most efficient for the vessel to be laden at, or near to, capacity.

However, this does not mean that the ratio will necessarily be very small if the vessel is not laden. This is because the vessel will typically be ballasted with water to increase the draught and in turn increase the stability of the vessel, particularly in rough sea conditions. Accordingly, the vessel may be determined to ballasted instead of laden if the ratio is at a moderate value, for example at 60%. It is important to note that the percentage threshold used to imply the cut-off between laden and ballasted vessels will vary for each vessel type and size.

Furthermore, if the vessel is determined to be at a port, because the vessel is determined to be within a polygon associated with a port, then the informational AIS draught data may also be used to determine if and roughly how much cargo is being loaded or offloaded at the port. If the draught reading of the vessel prior to entering the port polygon is significantly larger than the draught reading when the vessel departs from the port then it may be implied that the vessel has unloaded at the port. Alternatively, if the draught reading of the vessel prior to entering the port polygon is significantly smaller than the draught reading when the vessel departs from the port then it may be implied that the vessel has loaded at the port.

If a vessel is determined to remain outside a port for a given duration of time prior to entering the port polygon, then it may be determined that the vessel was waiting in a queue. Thus port waiting times may be analysed by monitoring the AIS position messages associated with a plurality of vessels in and around respective ports. This port waiting time may then be used to further refine determined response times that require the loading or unloading, for example of cargo or personnel, during the route from the vessel's origin to the event location.

In vessels where the draught reading of the AIS system is manually input, the draught reading data may not be updated exactly at the time of loading or unloading. Accordingly, the draught reading on arrival is taken to be the maximum reading that was received in a given period before arrival at the port, for example a period of 24 hours. Similarly, the draught reading at departure is taken to be the latest reading that was received in a given time period after departing from the port, for example a 24 hour period. If the draught at departure is only marginally higher than that at arrive then it may be concluded that the vessel was simply taking on fuel, known as bunkering.

In this manner, the present invention may infer whether a given vessel is laden or ballasted and accordingly the availability of that vessel for responding to an event may be implied. In turn, this implied status may be used to generate a warning that a given vessel may be laden and on a chartered course and therefore unavailable for responding to the event. Alternatively, the apparatus 20 may automatically filter out, from the vessel response data, vessels that are determined to be laden.

Whilst the present invention has been described in relation to the use of AIS data broadcast from respective vessels, it will be appreciated that other sources of vessel information including position information may be used in the present invention. Furthermore, whilst the invention has been described in relation to responding to shipping related emergencies of offshore assets, it will be appreciated that the apparatus may be used to respond to any number of events where a vessel having specified characteristics is required.

In this manner, an apparatus according to an embodiment of the present invention may be used to find vessels in a specific area that are capable of responding to one of a plurality of emergency scenarios or mission plans, for example responding to a breach at an oil rig or well that has led to an oil spill, based on the inventive use of certain vessel and AIS information combined with distance parameters.

The processor 28 may comprise one or more special purpose processing devices such as an application specific integrated circuit (ASIC), a field programmable gate array (FPGA), a digital signal processor (DSP), network processor, or other similar devices. The processor 28 may be configured to perform the operations and methods disclosed below. These operations may be carried out by a single processor or, alternatively, may be carried out by a number of processors connected together.

Figure 6:
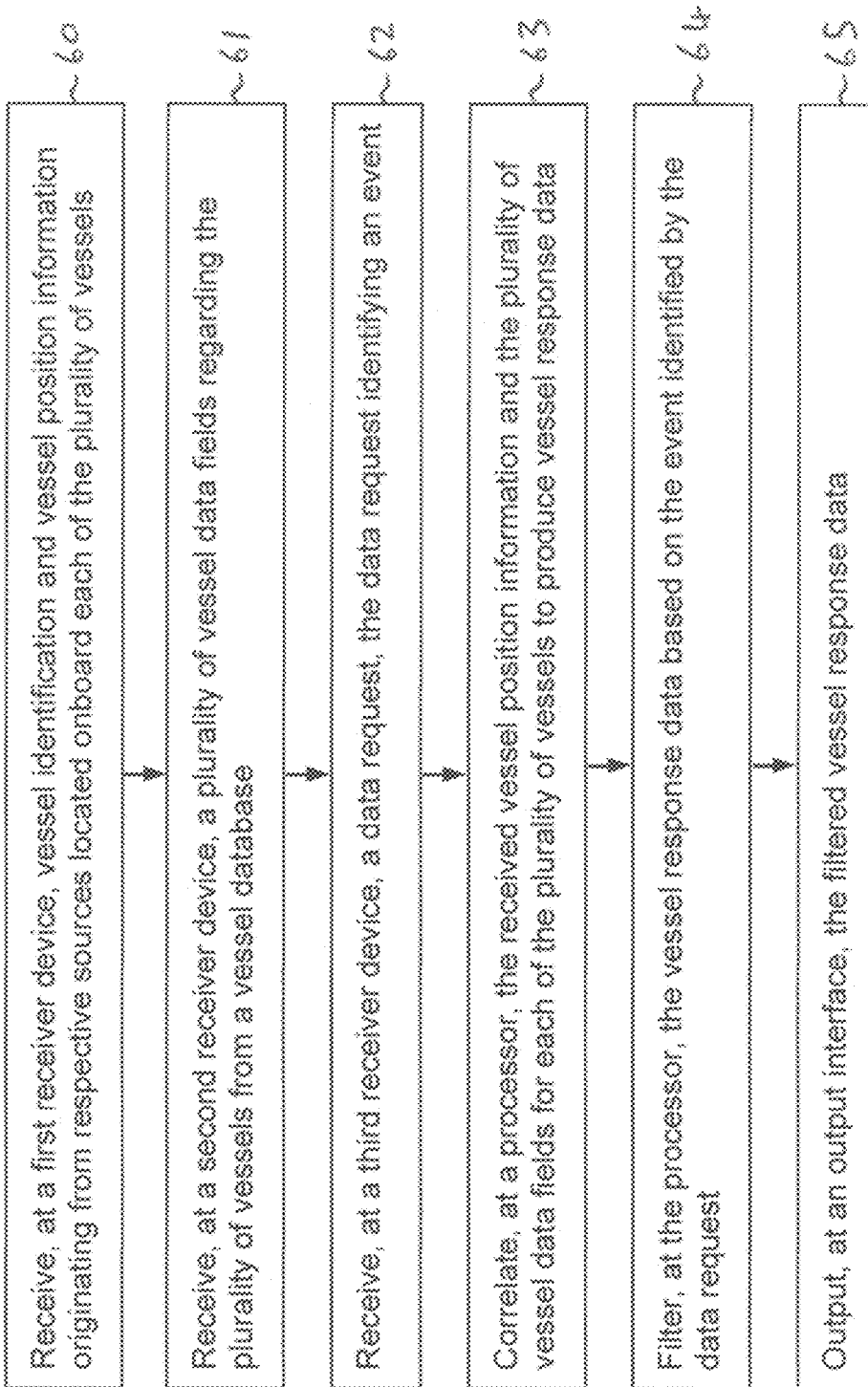
FIG. 6 is a flow diagram showing the main steps performed by an embodiment of the invention.

According to a second aspect of the invention, and with reference to FIG. 6, a method for monitoring the position of a plurality of vessels that may be capable of responding to an event may be provided. At step 60, the vessel identification and vessel position information originating from respective sources located onboard each of the plurality of vessels are received at the first receiver device 24. At step 61 a plurality of vessel data fields regarding the plurality of vessels from a vessel database are received at the second receiver device 26 and at step 62 a data request identifying an event is received at the third receiver device 30.

Then at step 63, the processor receives the data from the first and second receivers and correlates the received vessel position information and the plurality of vessel data fields for each of the plurality of vessels to produce vessel response data. This vessel response data is subsequently filtered by the processor at step 64 based on the event identified by the data request. Finally, the filtered vessel response data is output at an output interface at step 65.

The vessel identification and vessel position information received at the first receiver at step 61 may comprise AIS positional messages and further include AIS informational messages. Furthermore, the filtered vessel response data may be output from the output interface 32 in a grid format, or a map format for overlaying geographical mapping data.

As described with respect to the first aspect of the invention, the event may take one of a number of forms, including a shipping or logistics event, a surface event or a subsea event. Accordingly the filtering step at 64 of FIG. 6 may include filtering the filtered vessel response data based on at least one of a minimum crane wire length, a remotely operated underwater vehicle requirement, a supply vessel minimum deck area, an oil tanker classification or an oil spill response capability associated with the event identified by the received data request.

The received data request may identify a location associated with the event. If a location is not identified in the data request, then the data request preferably identifies an offshore platform or a requesting vessel. The requesting vessel will be a vessel that is requesting assistance from another vessel in response to an event that has occurred, accordingly the location of the vessel may be obtained from the AIS vessel information or other vessel position information based on an identification of the requesting vessel contained in the data request.

Figure 7:
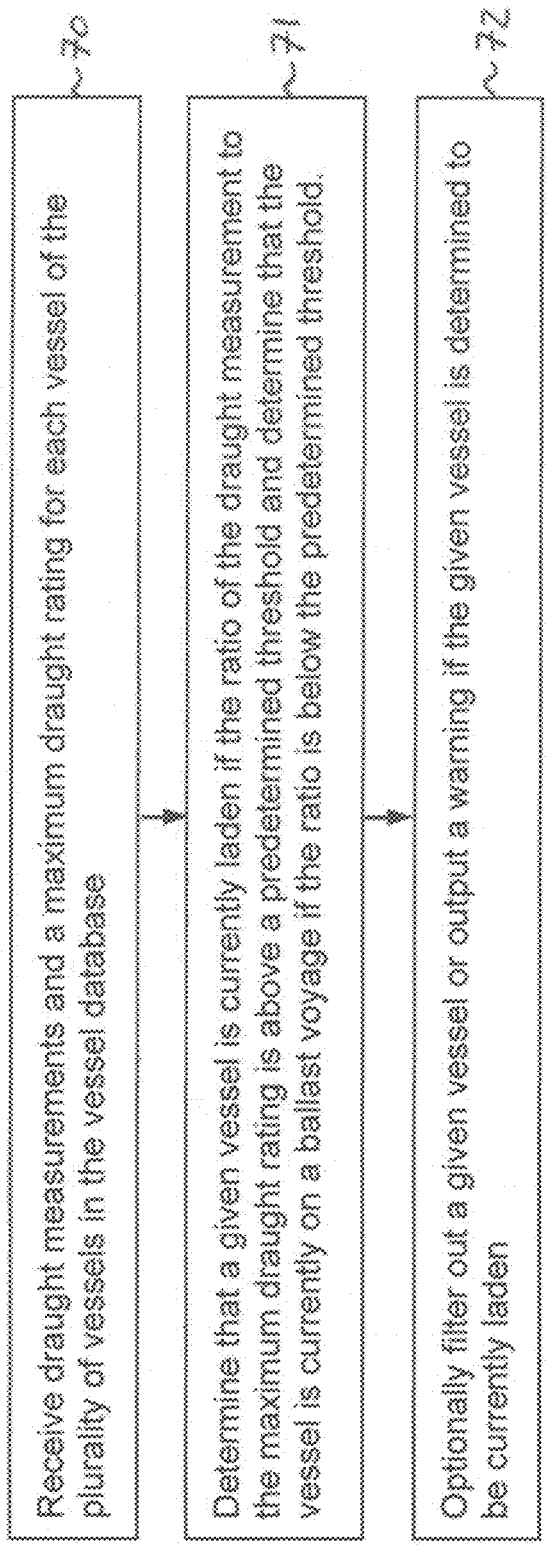
FIG. 7 is a flow diagram showing additional steps performed by a further embodiment of the invention.

If the data request identifies an offshore platform, then the location of the offshore platform may be retrieved from an offshore platform database preferably containing various information about the offshore platform including its location and oil well depth. The oil well depth will be equivalent to the minimum crane wire length required to reach the subsea oil well and accordingly the method may automatically obtaining the minimum crane wire length and the need for a remotely operated underwater vehicle from the offshore platform database when the received data request indicates that the event is a subsea response.

Where the AIS informational messages comprise a draught measurement for each vessel of the plurality of vessels, the additional method steps of FIG. 7 may optionally be performed. At step 70, the draught measurements are received from the AIS informational messaged and a maximum draught rating is received for each vessel of the plurality of vessels in the vessel database.

Figure 8:
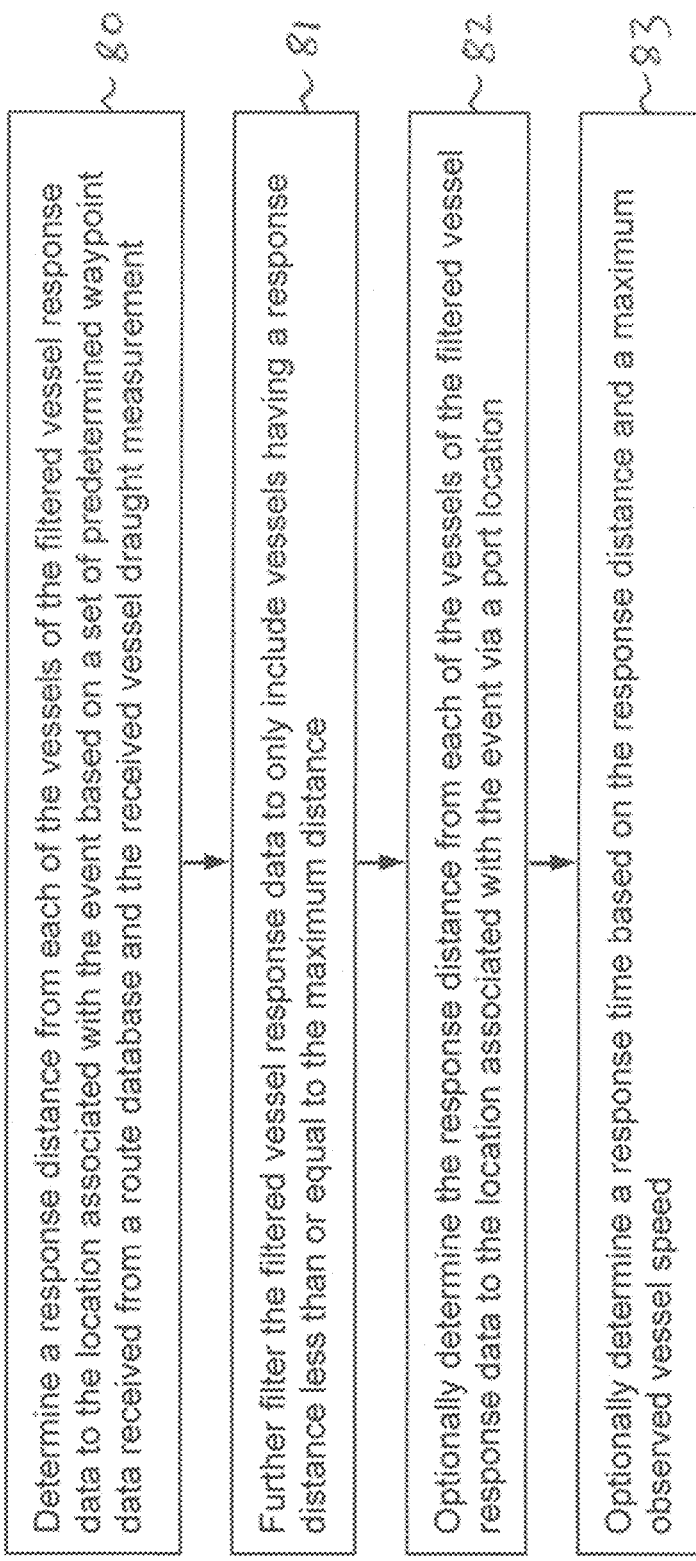
FIG. 8 is a flow diagram showing additional steps performed by an additional embodiment of the invention.

At step 71, the method determines that a given vessel is currently laden if the ratio of the draught measurement to the maximum draught rating is above a predetermined threshold and determines that the vessel is currently on a ballast voyage if the ratio is below the predetermined threshold. Optionally, the method may filter out a given vessel at step 72 if the given vessel is determined to be currently laden. Alternatively, step 72 may output a warning that the vessel is determined to be currently laden.

Where the received data request further identifies a maximum distance away from the event location for vessels to be filtered against, the additional method steps of FIG. 8 may optionally be performed. At step 80, a response distance from each of the vessels of the filtered vessel response data to the location associated with the event may be determined based on a set of predetermined waypoint data received from a route database and the received vessel draught measurement. The vessel response data may then be further filtered to only include vessels having a response distance less than or equal to the maximum distance at step 81.

At step 82, the response distance from each of the vessels of the filtered vessel response data to the location associated with the event may be optionally determined via a port location. This enables the route to take into consideration scenarios where the vessel will need to travel via a port in order to unload the cargo etc. that the vessel was previously transporting or alternatively to load cargo that is required for the response to the event.

Furthermore, a response time based on the response distance and a maximum observed vessel speed may also be optionally determined at step 83. It will be appreciated that step 82 need not be carried out in order for step 83 to be carried out.

The flowcharts of FIGS. 6, 7 and 8 illustrate the operation of an example implementation of the apparatus, computerized method and computer program products according to an embodiment of the present invention. Each block in the flowcharts may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, the processed associated with two blocks may be carried out simultaneously or, depending on the functionality, in the reverse order. Each block in the flowchart may be implemented in software, hardware or a combination of software and hardware.

The invention claimed is:

1. An apparatus for monitoring the position of a plurality of vessels that may be capable of responding to an event, comprising:
   a first receiver device configured to receive vessel identification and vessel position information originating from respective sources located onboard each of the plurality of vessels;
   a second receiver device configured to receive a plurality of vessel data fields regarding the plurality of vessels from a vessel database;
   a third receiver device configured to receive a data request, the data request identifying an event; and
   a processor configured to receive and correlate the vessel position information and the plurality of vessel data fields for each of the plurality of vessels to produce vessel response data;
   wherein the processor is further configured to receive the data request and to filter the vessel response data based on the event identified by the data request; and
   an output interface configured to output the filtered vessel response data.

2. An apparatus according to claim 1, wherein the first receiver device is configured to receive AIS positional messages comprising the vessel position information and the first receiver device is further configured to receive AIS informational messages.

3. An apparatus according to claim 2, wherein the AIS informational messages comprise a draught measurement for each of the plurality of vessels;
   wherein the processor is further configured to receive the draught measurements and to receive a maximum draught rating for each of the plurality of vessels from the vessel database; and
   wherein the processor is further configured to determine that a given vessel is currently laden if the ratio of the draught measurement to the maximum draught rating is above a predetermined threshold and to determine that the vessel is currently on a ballast voyage if the ratio of the draught measurement to the maximum draught rating is below the predetermined threshold.

4. An apparatus according to claim 3, wherein if a vessel is determined to be currently laden, the processor is further configured to filter out the laden vessel, or wherein the output interface is configured to output a warning associated with the laden vessel.

5. An apparatus according to claim 1, wherein the processor is further configured to automatically update a vessel data field of the vessel database based on vessel information received at the first receiver device.

6. An apparatus according to claim 5, wherein a vessel data field automatically updated by the processor includes at least one of a maximum observed vessel speed, a draught measurement, and a vessel laden status.

7. An apparatus according to claim 6, wherein the received data request further identifies a location associated with the event.

8. An apparatus according to claim 7, wherein the received data request further identifies an offshore platform or requesting vessel associated with the event and, in response to the received data request, the processor is configured to obtain the location of the offshore platform or requesting vessel associated with the event from an offshore platform database or the received vessel position information based on the respective identification of the offshore platform or requesting vessel.

9. An apparatus according to claim 8, wherein the received data request further identifies a maximum distance and wherein the processor is further configured to determine a response distance from each of the vessels of the filtered vessel response data to the location associated with the event and to further filter the filtered vessel response data to only include vessels having a response distance less than or equal to the maximum distance.

10. An apparatus according to claim 9, wherein the processor is configured to determine the response distance based on a set of predetermined waypoint data received from a route database and the received vessel draught measurement.

11. An apparatus according to claim 7, wherein the processor is configured to determine the response distance from each of the vessels of the filtered vessel response data to the location associated with the event via a port location.

12. An apparatus according to claim 11, wherein the processor is further configured to determine a response time based on the response distance and a maximum observed vessel speed.

13. An apparatus according to claim 1, wherein the processor is further configured to filter the filtered vessel response data based on at least one of a minimum crane wire length, a remotely operated underwater vehicle requirement, a supply vessel minimum deck area, an oil tanker classification or an oil spill response capability associated with the event identified by the received data request.

14. An apparatus according to claim 13, wherein the processor is configured to automatically obtain the minimum crane wire length and a remotely operated underwater vehicle requirement from an offshore platform database if the received data request indicates that the event is a subsea response.

15. An apparatus according to claim 1, wherein the output interface is further configured to output the filtered vessel response data in either a grid format or a map format for overlaying geographical mapping data.

16. A computerized method for monitoring the position of a plurality of vessels that may be capable of responding to an event, comprising:
receiving, at a first receiver device, vessel identification and vessel position information originating from respective sources located onboard each of the plurality of vessels;
receiving, at a second receiver device, a plurality of vessel data fields regarding the plurality of vessels from a vessel database;
receiving, at a third receiver device, a data request, the data request identifying an event;
correlating, at a processor, the received vessel position information and the plurality of vessel data fields for each of the plurality of vessels to produce vessel response data;
filtering, at the processor, the vessel response data based on the event identified by the data request; and
outputting, at an output interface, the filtered vessel response data.

17. A computerized method according to claim 16, comprising receiving, at the first receiver device, AIS positional messages, comprising the vessel position information, and AIS informational messages.

18. A computerized method according to claim 17, wherein the AIS informational messages comprise a draught measurement for each of the plurality of vessels, the method further comprising:
receiving, at the processor, the draught measurements, and a maximum draught rating for each of the plurality of vessels from the vessel database; and
determining, at the processor, that a given vessel is currently laden if the ratio of the draught measurement to the maximum draught rating is above a predetermined threshold and to determine that the vessel is currently on a ballast voyage if the ratio of the draught measurement to the maximum draught rating is below the predetermined threshold.

19. A computerized method according to claim 18, wherein if a vessel is determined to be currently laden, the method further comprises filtering out, at the processor, the laden vessel, or outputting, from the output interface, a warning associated with the laden vessel.

20. A computerized method according to claim 16, further comprising automatically updating, by the processor, a vessel data field of the vessel database based on vessel information received at the first receiver device.

21. A computerized method according to claim 20, wherein a vessel data field automatically updated by the processor includes at least one of a maximum observed vessel speed, a draught measurement, and a vessel laden status.

22. A computerized method according to claim 21, wherein the received data request further identifies a location associated with the event.

23. A computerized method according to claim 22, wherein the received data request further identifies an offshore platform or requesting vessel associated with the event and, in response to the received data request, the method further comprises obtaining, by the processor, the location of the offshore platform or requesting vessel associated with the event from an offshore platform database or the received vessel position information based on the respective identification of the offshore platform or requesting vessel.

24. A computerized method according to claim 22, wherein the received data request further identifies a maximum distance and the method further comprises determining a response distance from each of the vessels of the filtered vessel response data to the location associated with the event and filtering the filtered vessel response data to only include vessels having a response distance less than or equal to the maximum distance.

25. A computerized method according to claim 24, further comprising determining the response distance based on a set of predetermined waypoint data received from a route database and the received vessel draught measurement.

26. A computerized method according to claim 24, further comprising determining the response distance from each of the vessels of the filtered vessel response data to the location associated with the event via a port location.

27. A computerized method according to claim 24, further comprising determining a response time based on the response distance and a maximum observed vessel speed.

28. A computerized method according to claim 16, further comprising filtering the filtered vessel response data based on at least one of a minimum crane wire length, a remotely operated underwater vehicle requirement, a supply vessel minimum deck area, an oil tanker classification or an oil spill response capability associated with the event identified by the received data request.

29. A computerized method according to claim 28, further comprising automatically obtaining the minimum crane wire length and a remotely operated underwater vehicle requirement from an offshore platform database if the received data request indicates that the event is a subsea response.

30. A computerized method according to claim 16, further comprising outputting, from the output interface, the filtered vessel response data in either a grid format or a map format for overlaying geographical mapping data.

* * * * *